United States Patent
Miller

(10) Patent No.: US 7,470,349 B1
(45) Date of Patent: Dec. 30, 2008

(54) PRESSURE DESALINATION

(76) Inventor: Joel Miller, 5158 Moccasin Way, Antioch, CA (US) 94531

( * ) Notice: Subject to any disclaimer, the term of this patent is extended or adjusted under 35 U.S.C. 154(b) by 260 days.

(21) Appl. No.: 11/401,751

(22) Filed: Apr. 11, 2006

(51) Int. Cl.
*B01D 3/00* (2006.01)
*C02F 1/04* (2006.01)

(52) U.S. Cl. ............... 202/182; 159/DIG. 15; 159/DIG. 40; 202/184; 202/237; 202/267.1; 203/10; 203/25; 203/41; 203/86; 203/DIG. 17

(58) Field of Classification Search .......... 159/DIG. 15, 159/DIG. 40; 202/176, 182, 184, 187, 202, 202/237, 267.1; 203/2, 10, 25, 27, 41, 86, 203/100, DIG. 17; 210/664
See application file for complete search history.

(56) References Cited

U.S. PATENT DOCUMENTS

| | | | | |
|---|---|---|---|---|
| 3,801,284 A | * | 4/1974 | Meckler | 422/199 |
| 3,860,492 A | * | 1/1975 | Lowi et al. | 202/236 |
| 4,478,685 A | * | 10/1984 | Mortenson | 202/158 |
| 5,534,118 A | * | 7/1996 | McCutchen | 202/205 |
| 5,729,987 A | * | 3/1998 | Miller | 62/98 |
| 6,217,773 B1 | * | 4/2001 | Graham | 210/651 |

* cited by examiner

*Primary Examiner*—Virginia Manoharan
(74) *Attorney, Agent, or Firm*—Robert Samuel Smith

(57) ABSTRACT

A device for delivering purified water from a reservoir of salt water including a vapor tube supported concentrically inside a barrier tube The vapor tube has apertures that provide a passage of purified condensate from interior of the purified waste to the space between the space between the outside of the vapor tube and the inside of the barrier tube. A pump between the reservoir of salt water and the interior of the vapor tube generates a pressure differential that forces water vapor from the surface of salt water to the inside of the vapor tube. Condensate inside the vapor tube flows as fresh water to outside the vapor tube.

7 Claims, 2 Drawing Sheets

PRESSURE DESALINATION

FIELD OF THE INVENTION

This invention relates to desalination of salt water and particularly to water desalinated by a pressurized phase change.

BACKGROUND AND INFORMATION DISCLOSURE

A number of technologies have been investigated in the search to develop an economical method for desalinating water to satisfy the demand for fresh water.

For example, U.S. Pat. No. 6,695,951 to Bitterly et al discloses a series of rotating thin concentric shells which rotate at high velocity. Contaminated liquid is injected onto the surface of the shells. Centrifugal force causes the liquid to form a thin film along the inward-facing surface of the shell. A compressor lowers the pressure adjacent the thin film causing the liquid to boil. The compressor carries the vapor to the other side of the shells at a slightly higher temperature. There the vapor encounters the wall which is cooler because the heat was transferred to boil the contaminated liquid the vapor condenses and rotation throws the condensate against the adjacent wall where it is collected. Heat of condensation is transferred to the shell for boiling contaminated liquid.

This disclosure is characterized by a requirement for large kinetic energy of rotation that is necessary to sustain the process.

U.S. Pat. No. 6,699,369 discloses an apparatus that atomizes seawater using non-pneumatic nozzles. The seawater spray stream is directed into an evaporation chamber air, heated by waste heat is directed. The resultant micro-droplets undergo rapid evaporation resulting in the separation of salt solids from the vapor phase of the water. The mixture of suspended solids and water is filtered to remove and collect the salts. Water vapor is condensed to collect salt free water.

This system is characterized by a requirement to dissipate unused energy of condensation.

U.S. Pat. No. 6,833,056 discloses an apparatus including a heat exchanger cooperating with an evaporation can so as to subject raw water in the evaporation can to heat exchange and thereby generate water vapor in the evaporation can. A condenser cooperates with a raw water tank to receive water vapor from an evaporator can. Subjecting water vapor cools the water vapor and raw water in the raw water tank to heat exchange and thereby obtain distilled water.

In other widely used processes, reverse osmosis has gained the majority market share because of its superior cost performance.

Water produced by reverse osmosis remains an expensive process compared to natural water so the search goes on to satisfy an ever-growing demand. Several types of reverse osmosis have been disclosed and are on the market. The popular commercial systems of choice (as judged in terms of market share) uses TEFLON™ as the membrane material for the reverse osmosis process. The membranes are manufactured by U.S.FILTERS, Inc.

The reverse osmosis systems are expensive to maintain and require up to 800 pounds per square inch to operate. These membranes last only a period of about seven years.

Furthermore, the toxic bacteria that builds up cannot be conveniently cleaned from the TEFLON membrane because the Teflon is degraded by cleansing compounds containing chlorine.

SUMMARY OF THE INVENTION

It is an object of this invention to provide an apparatus for desalinating water that is economical compared to competing systems.

It is also an object that the desalination process is amenable to producing desalinated water at a large rate.

This invention is directed toward an array of components that are conveniently ganged together for large rate of production.

Each component comprises a solid "vapor" conduit positioned in side and concentric with a "barrier tube" The outside of the barrier tube is covered by an absorbent medium that is partly immersed in a reservoir of salt water.

A turbine forces water vapor evaporated from the reservoir into a a condenser tube where it is condensed and conducted away as desalinated water.

DESCRIPTION OF A BEST MODE

Figure 1:
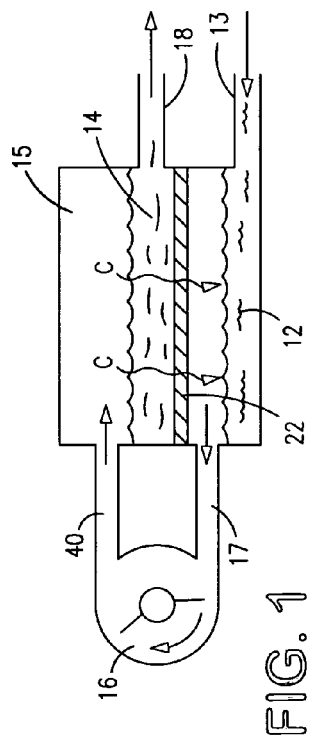
FIG. 1 illustrates the principles of the invention.

Turning now to a description of the drawings, FIG. 1 is a representation of principles of the invention 10, showing:

a reservoir of salt water 12 which receives salt (polluted) water through inlet 13. (arrow A);

a reservoir of pure water 14 that delivers pure water through outlet 18; a pump 16 connected to pump water vapor evaporating from reservoir 12 to reservoir 14 where vapor condenses and flows out of port 18 (arrow B).

Barrier 22 is a wall that is a good thermal conductor so that heat of condensation, generated by vapor condensing in pure water reservoir 14 flows (arrow C) through the wall to reservoir 12 of salt water where it assists the evaporation of water in the reservoir 12.

Figure 4:
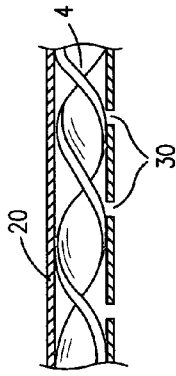
FIG. 4 shows a ribbon in the vapor tube.
Figure 3:
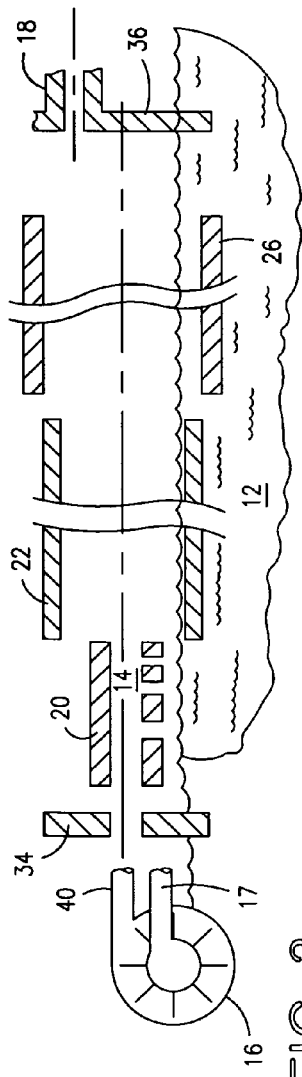
FIG. 3 is an exploded view of FIG. 2.
Figure 2:
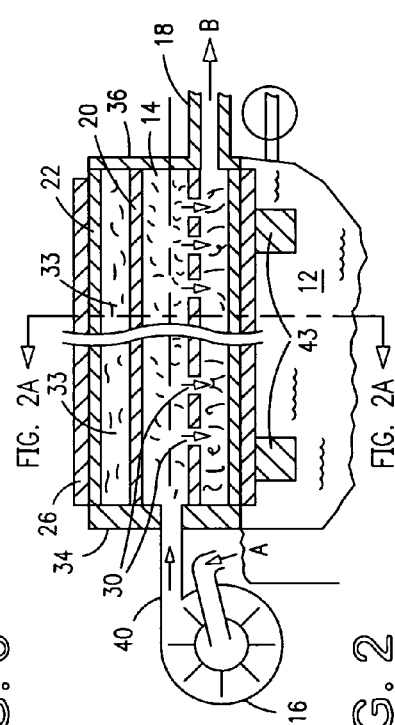
FIG. 2 is a cross sectional assembly view of the invention

FIG. 2 is a sectional assembly view and FIG. 3 is a sectional exploded view showing details of the invention.

Figure 2A:
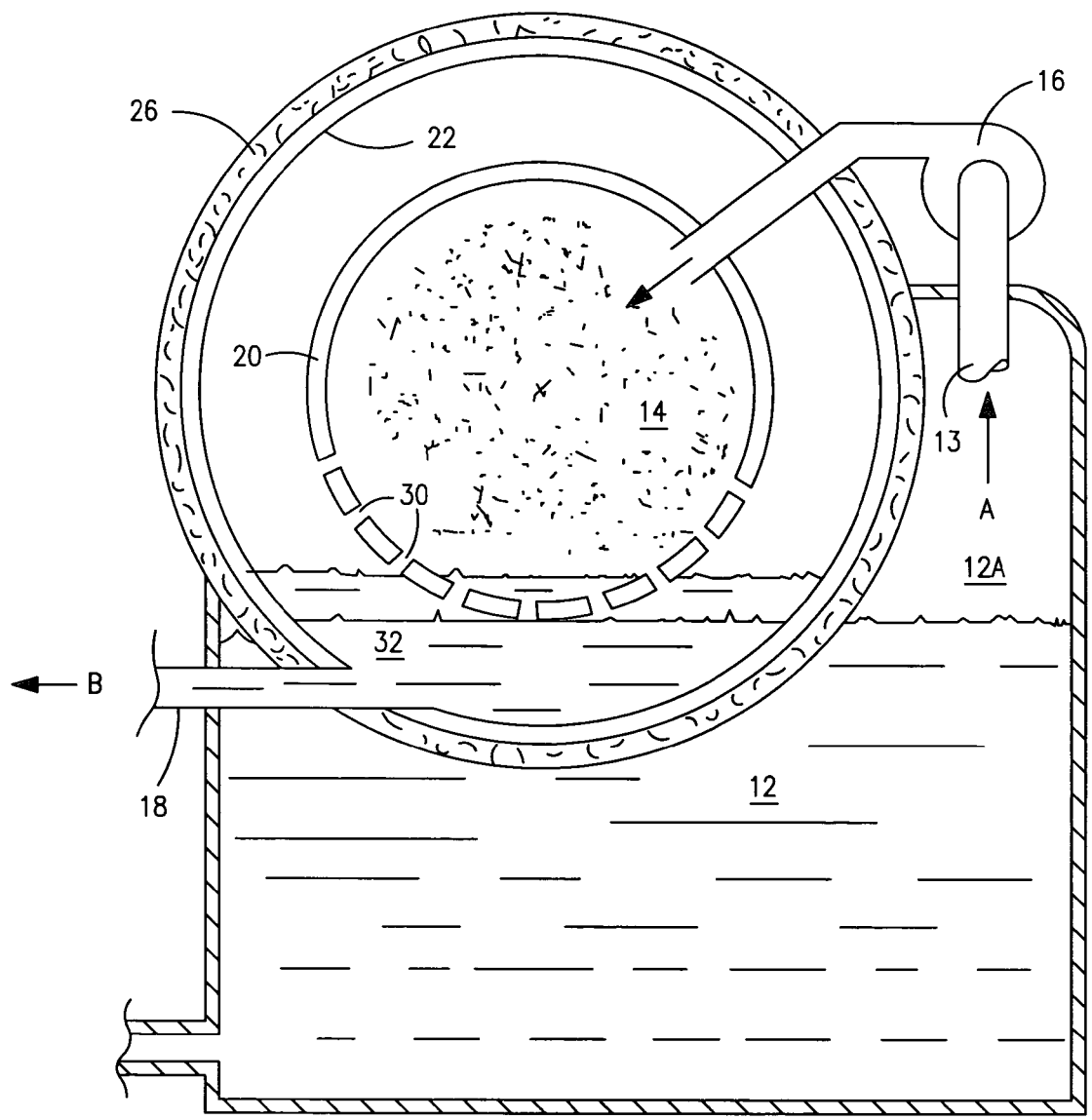
FIG. 2A is a sectional view in the axial direction

FIG. 2A is a sectional view taken parallel to the axial direction of the tubes. There are shown:

Two concentric tubes, an inner tube 20 positioned inside an outer tube 22.

The outer tube is at least partially immersed in a reservoir 12 of salt water.

A pump 16 forces vapor from the salt water reservoir 12 into the freshwater

Both tubes comprise a material which is a good heat conductor and is strongly resistant to corrosion. A preferred material for these purposes is chromium-nickel alloy plated onto a copper tube. Both the inside and outside surfaces are plated with this alloy. The Cr—Ni plating provides excellent corrosion resistance. The copper base provides excellent thermal conductivity.

The outside tube 22 (referred to herein as the "barrier conduit" is covered by an absorbent sleeve 25, preferably a textile.

The tube assembly is supported by supports 43 such that a part of the tube assembly is immersed in sea water. The absorbent sleeve is thereby partly immersed in the reservoir of sea water and the remaining part of the sleeve is above the surface of salt water. The sleeve is thereby positioned to be entirely soaked by salt water and the surface from which evaporation occurs from the surface of the sleeve that is out of the salt water pool 12.

The inner tube has an array of holes 30 so that the space 33 between the inner and outer tube communicates with the inside of the inner tube 20.

The two concentric tubes are supported in relative positions by an entry cap 23 on the entry end of the tubes and an exit cap 36 on the exit end of the tubes.

A pump 16 is positioned at the entry end of the tubes and has an inlet 17 communicating with the space 12A above the surface 12B of the salt water 12 in reservoir of salt water 12. The pump 16 has an exit 40 communicating with the interior tubes through an entrance cap 34 on the end of the (outer) barrier tube and (inner) vapor conduits. The reservoir 12 of salt water is confined in a tank 11 as shown in FIG. 2A The pump 16 generates a pressure gradient between region 12A and the interior of the inner tube 20 Water evaporates from the surface of the textile sleeve 26 and the water vapor is pumped into the vapor chamber 14 where the water vapor is condensed.

The vapor that condenses from the interior of the vapor conduit 20 flows through openings 30 in the vapor tube 20 and collects in the "pure water" Reservoir 32 (the space between the inner and outer tubes.)

As pure water flows into the freshwater reservoir 32, the accumulation of fresh water flows out through the exit cap 18.

As the vapor in the interior of the inner tube condenses, the heat of condensation is conducted through the metal barrier tube 22 and is absorbed by salt water in the sleeve 26. The absorption of heat of condensation by the sleeve (soaked in alt water) aids the generation of water vapor evaporated from the reservoir of salt water.

There has been described a desalination system that has a number of advantages over the prior art, particularly systems of the prior art that rely on reverse osmosis.

The system comprises a reservoir of salt water on one side of an impervious barrier and a reservoir o of pure water on the opposite side of the impervious barrier. The pump pumps vapor from the salt water reservoir to the fresh water reservoir AROUND the barrier.

Only a moderate pressure difference (a few psi) between the salt water and fresh water reservoirs) is required for efficient operation. At most, a pressure differential of 15 psi is applied although a pressure difference of 0.2 psi has provided very satisfactory operation.

The system of this invention is not sensitive to time dependent degradation compared to systems involving membranes or ion exchange.

In the context of this specification, the term "pollutants" is understood to mean any of salts, organic or inorganic particulates or non volatile substances that are commonly understood to pollute water. Pure water is understood to mean water from which such pollutants have been removed.

In the context of this specification, the term "pump" is understood to apply to a device that forces fluid from one region to another and includes displacement pumps, centrifugal pumps, paddle wheels or other devices well known in the art.

The present invention is not sensitive to types of pollution whose presence is a real drawback to other systems which discriminate against certain types of pollutants including, in addition to salts, heavy metals, and toxic organic life forms.

The system does not require the frequent cleaning and replacement of membranes as is required in reverse osmosis systems.

Another advantage is that there is not the high pressure required to "push" the water through a membrane. Instead, a turbine draws vapor around the barrier between salt water reservoir and the fresh water reservoir. This requires considerably less pressure which can be applied with a turbine. The turbine consumes substantially less power than a displacement pump such as is required to drive fluid through a membrane.

Variations and modifications of this invention, contemplated after reading the specification and studying the drawings, may be within the scope of the invention.

For example, fig. shows a twisted ribbon 42 that is to be inserted into the vapor tube 20 wherein the width of the twisted ribbon 42 extends across the inner diameter of the vapor tube 20. The twisted ribbon 42 lengthens the path between the entrance and exit apertures of the vapor tube 20 thereby increasing the efficiency of the condensation process.

As another example, neither the barrier tube nor the vapor tube must be cylindrical but may have other shapes such as having cross sections that are elliptical polygonal.

Although both the entrance to the interior of the vapor tube and the exit to the space between the vapor tube and the barrier tube are selected in the description as being in respective ends of the barrier and vapor tubes, these openings may also be positioned in other locations of the tubes.

In view of these and other modifications that read on the invention, I therefore wish to define the scope of my invention by the appended claims.

What is claimed is:

1. A system for converting polluted water to purified water, said system comprising:
    a first enclosed reservoir with an inlet for receiving polluted water;
    a second enclosed reservoir arranged for delivering purified water through an outlet;
a pump means having an inlet communicating with said first reservoir and an outlet communicating with said second reservoir for establishing a lesser vapor pressure at said inlet than at said outlet whereby purified water vapor is generated from polluted water in said first reservoir and transferred through said pump and condenses in said second reservoir;
    a barrier wall between said first and second reservoir;
    said barrier wall being a conductor of heat selected to provide that heat of condensation generated by water vapor condensing in said second reservoir is transmitted through said barrier wall and contributes to heat of evaporation required to support evaporation of water vapor in said first reservoir.

2. The apparatus of claim 1 wherein said barrier wall is copper plated with an alloy of chromium and nickel.

3. An apparatus for converting polluted water to purified water, said system comprising:
    a barrier tube;
    a vapor tube inside said barrier tube substantially concentric with said barrier tube;
said vapor tube having an array of apertures in a wall of said vapor tube;
    a pump having an inlet communicating with a reservoir of polluted water above a level of said polluted water and an outlet of said pump communicating with an entrance to an inside region of said vapor tube;
an outside region of said vapor tube being a space between an inside of said barrier tube and an outside of said vapor tube;
said pump, with outlet communicating with said inside of said vapor tube and inlet communicating with said region above said level of polluted water, draws water vapor from said region of polluted water and delivers water vapor to said inside of said vapor tube whereby water vapor in said vapor tube flows through said apertures and condenses by virtue of contact with an inside surface of said barrier tube and is directed by said barrier tube to flow into a reservoir of purified water;

said barrier tube conducting heat of condensation from vapor condensing on an inside of said barrier tube, contributes to heat of evaporation on an outside surface of said barrier tube.

4. The apparatus of claim 3 further comprising an absorbent sleeve enclosing said barrier tube.

5. The apparatus of claim 4 comprising means for maintaining said barrier tube partially submerged in said reservoir of polluted water enabling said sleeve to be soaked by migration of polluted water through said sleeve providing that evaporation from said reservoir includes from said sleeve soaked with said polluted water.

6. The apparatus of claim 5 wherein said absorbent sleeve is a textile.

7. The system of claim 3 wherein:

said entrance to an inside region of said vapor tube comprises a cap enclosing one end of said vapor tube and said barrier tube and an opening leading into said inside of said vapor tube.

* * * * *